United States Patent [19]

Bibler

[11] Patent Number: 5,190,628
[45] Date of Patent: Mar. 2, 1993

[54] METHOD AND APPARATUS FOR REMOVING IONS FROM SOIL

[76] Inventor: Jane P. Bibler, 813 E. Rollingwood Rd., Aiken, S.C. 29801

[21] Appl. No.: 841,108

[22] Filed: Feb. 25, 1992

[51] Int. Cl.⁵ ............................................. B01D 61/44
[52] U.S. Cl. .................................. 204/182.4; 210/638
[58] Field of Search ................ 204/130, 137, 180.7, 204/182.3, 182.4, 302, 306; 210/638

[56] References Cited

U.S. PATENT DOCUMENTS

| | | | |
|---|---|---|---|
| 2,831,804 | 4/1958 | Collopy | 204/131 |
| 4,220,726 | 9/1980 | Warshawsky | 521/55 |
| 4,354,942 | 10/1982 | Kaczur et al. | 210/712 |
| 4,376,598 | 3/1983 | Brouns et al. | 405/258 |
| 4,578,195 | 3/1986 | Moore et al. | 210/679 |
| 4,604,321 | 8/1986 | Okahara et al. | 428/319.9 |
| 4,908,137 | 3/1990 | Chen et al. | 210/679 |

*Primary Examiner*—Frank Sever
*Attorney, Agent, or Firm*—Harold M. Dixon; William R. Moser; Richard E. Constant

[57] ABSTRACT

A method and apparatus for selectively removing species of ions from an area of soil. Permeable membranes 14 and 18 impregnated with an ion exchange resin that is specific to one or more species of chemical ions are inserted into ground 12 in close proximity to, and on opposing sides of, a soil area of interest 22. An electric potential is applied across electrodes 26 and 28 to cause the migration of ions out of soil area 22 toward the membranes 14 and 18. Preferably, the resin exchanges ions of sodium or hydrogen for ions of mercury that it captures from soil area 22. Once membranes 14 and 18 become substantially saturated with mercury ions, the potential applied across electrodes 26 and 28 is discontinued and membranes 14 and 18 are preferably removed from soil 12 for storage or recovery of the ions. The membranes are also preferably impregnated with a buffer to inhibit the effect of the hydrolysis of water by current from the electrodes.

12 Claims, 1 Drawing Sheet

METHOD AND APPARATUS FOR REMOVING IONS FROM SOIL

The U.S. Government has rights in this invention pursuant to Contact No. DE-AC09-89SR18035 between the U.S. Department of Energy and Westinghouse Savannah River Company.

BACKGROUND OF THE INVENTION

1. Field of the Invention

The present invention relates to the treatment of soils. More particularly, the present invention relates to selectively removing species of ions from a particular area of soil.

2. Discussion of Background

Using a non-reacting media to carry ion exchange resins is known. Furthermore, the use of electric potentials to induce ion migration is described in U.S. Pat. No. 2,831,804. However, it is believed that an electric potential has not been used in conjunction with ion exchange resins to cause the migration of ions through or from an area of soil.

Collopy, in U.S. Pat. No. 2,831,804, discloses the introduction of direct current to ground water to increase the removal of sodium ions from the immediate area of soil. This method requires leaching to completely remove the sodium ions from the soil.

Several methods exists for removing chemical elements from aqueous streams. In U.S. Pat. No. 4,220,726, Warshawsky uses a macoporous polymer impregnated with a resin to remove metals from an aqueous stream. Similarly, Chen, et al. (U.S. Pat. No. 4,908,137) disclose the use of an ion exchange media bonded to a synthetic polymer for removing heavy metals from aqueous solutions.

U.S. Pat. Nos. 4,578,195 and 4,604,321 disclose the selective removal of mercury ions from an aqueous environment using a mercury-specific agent. Moore, et al. (U.S. Pat. No. 4,578,195) focus on removing trace elements of mercury. Okahara, et al. (U.S. Pat. No. 4,604,321), however, disclose an agent, and method for preparing the agent, which is capable of removing a larger amount of mercury from various gaseous or aqueous media.

Existing methods for chemically treating an area of soil are somewhat limited in scope and generally involve immobilizing, rather than removing or recovering elements from the soil. In U.S. Pat. No. 4,376,598, Brouns, et al. disclose a method of vitrification for immobilizing waste materials contained in the soil. The area of soil is heated, then allowed to cool and harden into a vitreous, solid mass. In U.S. Pat. No. 4,354,942, Kaczur discloses the use of sulfur compounds that react with mercury deposits in the soil to form insoluble compounds which are not removable by elution. Moreover, methods for removing copper from a spill area through the use of zeolites impregnated in a polymer are known.

There is a need for an efficient method of removing chemical elements from a volume of soil.

SUMMARY OF THE INVENTION

According to its major aspects and broadly stated, the present invention is a method and apparatus for removing chemical ions from an area of soil. In particular, the present invention uses a permeable membrane impregnated with ion exchange resin that is specific to one or more species of chemical ions. Two or more membranes are inserted into the ground in close proximity to and on opposing sides of the soil area of interest. An electric potential is also applied to the area of soil through electrodes to expedite the migration of ions from the soil. Preferably, the membranes are positioned between the electrodes and the soil area. Once the permeable membrane's ion exchange resin becomes saturated with ions from the soil, the electric potential applied to the soil area can be discontinued and the permeable membrane removed from the soil along with the captured ions.

A major feature of the present invention is the structure of the polymer membrane. The membrane is flexible and easily transported, installed and removed. It can carry more than one resin and carry resins uniformly dispersed. The membrane thus can be conformed to a variety of situations, from environmental remediation of, say, mercury contamination, to mining. The use of ion exchange technology within the permeable membrane structure enables the ionic species of interest to be removed from the soil, rather than just immobilized and left in place. Complete removal is especially important in certain applications such as hazardous spills, mining, and the like.

Another important feature of the invention is the configuration of the system. The membrane is preferably placed between the soil area and the electrodes, most preferably at an equal-potential distance and is adjacent to the electrodes. Under certain conditions, the migration of ions to the electrodes has been found to be incomplete, that is, the ions will not advance all the way to the electrodes and may in fact reverse direction. Therefore, increasing the radial dimension of the membrane assures that the ions are captured before they stop migrating or reverse direction.

Another feature of the present invention is the application of an electric potential to increase the migration of the ions. The migration thus induced greatly speeds the process and assures the recovery of the ions. Furthermore, in the case of an environmental contaminant released into the soil in an area where there might be a net gradient in the groundwater, the use of a potential can prevent the further spread of the contaminants.

Yet another feature is the use of buffers within the permeable membrane. This feature increases the efficiency of the present method by providing a better environment for the migration of ions. The buffers eliminate unwanted ions that may otherwise interfere with the migration of ions to be captured.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cross-sectional view of an apparatus for removing chemical ions from an area of soil according to a preferred embodiment of the present invention;

DETAILED DESCRIPTION OF A PREFERRED EMBODIMENT

Figure 2:
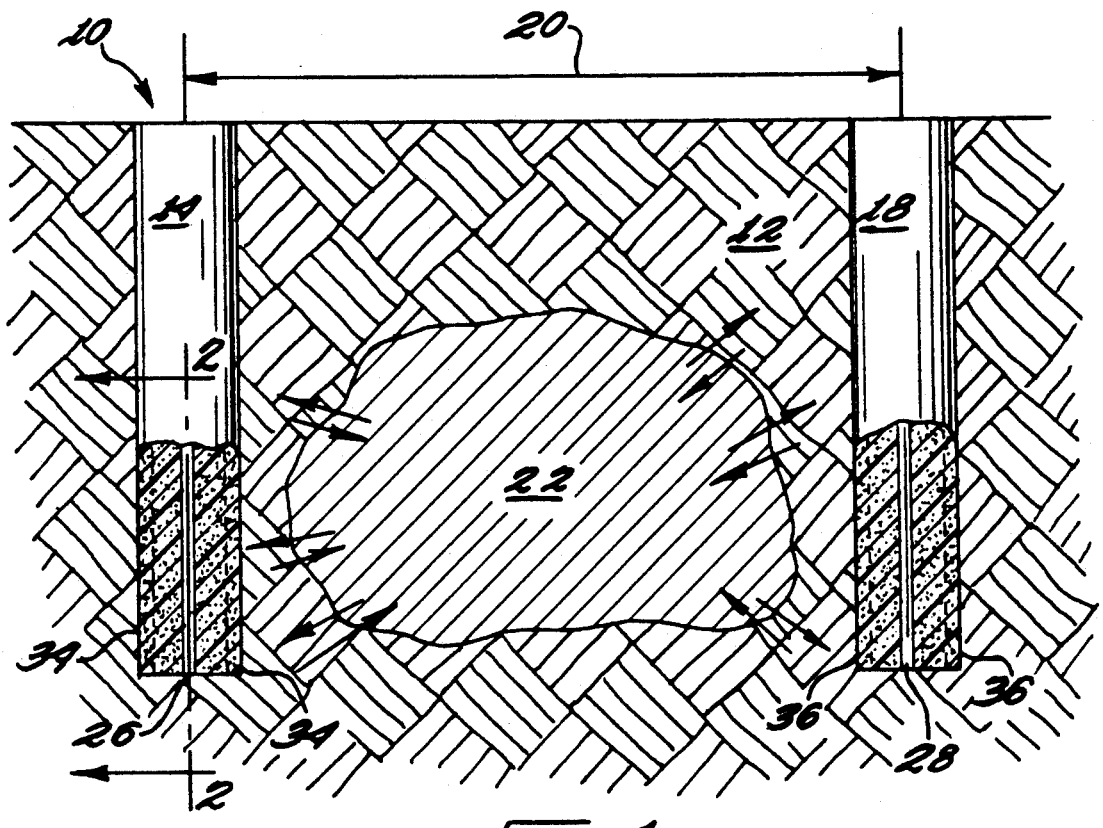
FIG. 2 is a partial cross-sectional view of a hydrophilic polymer membrane taken along lines 2—2 of FIG. 1.
Figure 2:
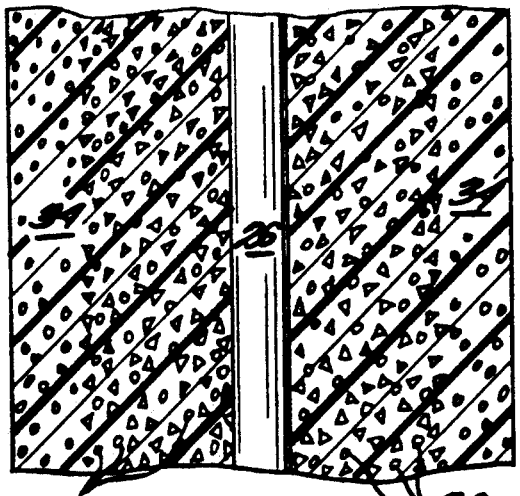

Referring now to FIG. 1, an apparatus 10, shown in its preferred embodiment, is used to remove species of ions from soil 12. Apparatus 10 comprises a first cylindrical membrane 14 and a second cylindrical membrane 18, spaced apart from each other by a distance 20, with a particular soil area of interest 22 existing between them. Although membranes 14 and 18 are shown as cylinders, the present invention does not require them to be cylindrical for every application or for any application. Distance 20 will vary depending on the size of soil area 22, type of soil 12 and other factors to be described below. Soil area 22, in this illustration of the present invention, is contaminated as a result of a spill of hazardous or contaminated material that has seeped into ground 12. Alternatively, soil area 22 can be an area known to contain deposits of an ion, the removal of which is desired for, say, refinement and subsequent commercial use.

Referring to both FIGS. 1 and 2, the latter showing a detailed view of a preferred embodiment of permeable membrane 14, each membrane 14, 18, surrounds an electrode 26, 28, preferably made of titanium, which is connected to a source of direct current (not shown) so that electrodes 26, 28 comprise two oppositely charged terminals. An ion exchange resin in the form of beads 30 is dispersed completely throughout membranes 14, 18. Membranes 14, 18 are preferably composed of hydrophilic polymer, such as the "ISOLOCK" manufactured by Isotron, Inc., and the ion exchange resin 30 impregnating the membranes is resin specific to at least one species, preferably at least mercury, a well-known contaminant. The innermost portion of membranes 14, 18 may further contain buffers 32 to absorb ions other than those of interest from the resins.

The relative orientations of membranes 14, 18 and electrodes 26, 28 is important in the successful functioning of the apparatus. Membranes 14, 18 must extend radially outward a sufficient distance from electrodes 26, 28, respectively, because the ionic species are not drawn by the potential difference of the electrodes all the way to the electrode of sign opposite to that of the ion. At some point near the electrode to which the ions are drawn, the attraction stops and apparently becomes a repulsion. While not wishing to be bound by theory, it is believed that ionization of molecules of groundwater to $H^+$ and $OH^-$ in the immediate vicinity of the electrodes produces an ionic barrier for the migrating species. Thus, for the ions to be trapped by the resin in the membrane, membranes 14, 18 must extend far enough away from electrodes 26, 28 to be in the path of an ionic migration to the electrodes.

Also, it is preferable for membranes 14, 18 to be positioned along an equi-potential line from electrodes 26, 28, respectively, where the field strength and ion flux is uniform as long as the resin material 30 is uniformly distributed throughout the membranes, so that the resin therein can be uniformly saturated. Thus, if electrodes 26, 28 are in the form of rods, membranes 14, 18 should be in the form of cylinders, or portions of cylinders with the portion directed toward the opposing electrode. If the electrodes are in the form of planes, such as a wire mesh or screen, then the membranes can also be in the form of planes or sheets parallel to planar electrodes.

The size of membranes 14, 18 and the electric potential will of course depend on the type of ionic species in the soil, the type of soil, the amount of moisture in the soil, the speed of migration desired, the extent of the spill and other factors apparent in each specific case. Wet sandy soils permit faster migration than clayey soils that have just enough moisture so that cracks do not form. In a typical clayey soil, however, with a ten-foot electrode-to-electrode spacing and a cylindrical membrane with a four inch radius surrounding each electrode, a potential of 60 volts direct current is sufficient for a migration of mercury. If more humus is present, a higher potential is required.

In use, referring to FIG. 1, permeable membranes 14 and 18, which are impregnated with an ion specific resin such as GT-73 and buffers, are inserted into ground 12, in close proximity to, and on either side of, soil area 22. Next, a potential is applied across electrodes 26 and 28, thereby generally containing contaminants in soil area 22. If the potential applied to electrode 26 is positive, electrode 26 becomes the anode and electrode 28 becomes the cathode. With the assistance of the applied potential, cations migrate generally toward cathode 28 and anions to the anode 26. Unfortunately, some of the ions do not migrate all the way to the appropriate electrode. It is believed that this incomplete migration might perhaps be due to the effect of the electrolysis of water occurring in the immediate vicinity of anode 26 and cathode 28. Therefore, to at least partially counter this effect, buffers 34, 36, which preferably occupy the innermost portion of membranes 14, 18, are used to assist the migration of ions by curbing the effects of electrolysis.

Ions of the desired species migrate toward electrodes 26 and 28 to be captured by exchange resin 30, which is impregnated completely throughout membranes 14 and 18. These regions simultaneously dispense, preferably, hydrogen or sodium ions in exchange for the ions they have captured. This migration and exchange sequence continues until the resins in membranes 14, 18 become saturated with ions of the desired species. Preferably, membranes 14 and 18 are a hydrophilic polymer that will not allow the captured species of ions to be leached directly back into soil areas 12 or 22. Ideally, a plurality of membranes have been inserted near soil area 22, each associated with its own electrode, to remove a desired amount of the particular ion species. Membranes 14 and 18 are then removed from soil 12, taking with them captured ions from soil area 22. Saturated membranes removed from the soil are then safely stored or processed to remove the captured ions.

It will be apparent to those skilled in the art that many changes and substitutions can be made to the preferred embodiment herein described without departing from the spirit and scope of the present invention as defined by the appended claims.

What is claimed is:

1. A method for removing at least one species of ions from an area of soil having groundwater, said method comprising the steps of:
   placing at least two electrodes in spaced relation with respect to each other and to said area of soil;
   placing a permeable barrier adjacent each of said at least two electrodes and said area of soil, said barrier adapted to pass said groundwater, said barrier carrying an ion exchange resin, said resin being selective for said at least one species of ions; and
   applying a potential across said electrodes, said potential causing said at least one species of ions to migrate with respect to said electrodes, thereby allowing said ion exchange resin carried in said permeable barrier to capture said species.

2. The method as recited in claim 1, wherein said permeable barrier further comprises buffers, said buffers enabling said at least one species of ions to be captured by said resin.

3. The method as recited in claim 1, wherein said method further comprises removing said permeable barrier from said area of soil when said resin carried by said barrier is approximately saturated.

4. The method as recited in claim 1, wherein said permeable barrier is a hydrophilic polymer membrane.

5. The method as recited in claim 1, wherein said ion exchange resin is mercury specific.

6. The method as recited in claim 1, wherein said ion exchange resin is distributed uniformly throughout said permeable barrier.

7. The method as recited in claim 1, wherein said at least two electrodes are made of titanium.

8. A method for removing a plurality of mercury ions from a contaminated area of soil having groundwater, said method comprising the steps of:

placing an anode and a cathode a distance apart from said contaminated area of soil, said anode and cathode in spaced relation with respect to each other and to said contaminated area of soil;

placing a first and second hydrophilic polymer membrane adjacent each of said anode and cathode, said first and second membranes spaced apart so as to define an active region therebetween, said contaminated area of soil generally contained within said active region, said first and second membranes each impregnated uniformly with a mercury specific ion exchange resin; and applying a potential across said anode and cathode, said potential causing said plurality of mercury ions to migrate with respect to said anode and cathode through said membranes, thereby allowing said resins to capture said mercury ions.

9. The method as recited in claim 8, wherein said first and second membranes are further impregnated with buffers, said buffers dispersed uniformly throughout a portion of said first and second membranes, said portion being adjacent said electrodes.

10. The method as recited in claim 8, wherein said method further comprises removing said first and second membranes from said area of soil when said membranes are substantially saturated.

11. The method as recited in claim 8, wherein said cathode and said anode are both made of titanium.

12. The method as recited in claim 8, wherein said first and second membranes are spaced approximately 10 feet apart and said electric potential is approximately 60 volts DC.

* * * * *